(12) United States Patent
An

(10) Patent No.: US 10,850,668 B2
(45) Date of Patent: Dec. 1, 2020

(54) REAR-VIEW MIRROR FOR VEHICLE

(71) Applicant: LG Electronics Inc., Seoul (KR)

(72) Inventor: Daehyun An, Seoul (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 15/855,610

(22) Filed: Dec. 27, 2017

(65) Prior Publication Data
US 2018/0319340 A1 Nov. 8, 2018

(30) Foreign Application Priority Data
May 8, 2017 (KR) .................. 10-2017-0057449

(51) Int. Cl.
*B60R 1/12* (2006.01)
*B60R 1/04* (2006.01)
*B60K 35/00* (2006.01)
*B60R 1/00* (2006.01)

(52) U.S. Cl.
CPC .............. *B60R 1/12* (2013.01); *B60K 35/00* (2013.01); *B60R 1/00* (2013.01); *B60R 1/04* (2013.01); *B60K 2370/176* (2019.05); *B60K 2370/21* (2019.05); *B60K 2370/23* (2019.05); *B60K 2370/27* (2019.05); *B60K 2370/67* (2019.05); *B60K 2370/744* (2019.05); *B60K 2370/777* (2019.05); *B60R 2001/1215* (2013.01); *B60R 2001/1253* (2013.01); *B60R 2300/404* (2013.01); *B60R 2300/8066* (2013.01)

(58) Field of Classification Search
CPC .... B60R 1/12; B60R 1/00; B60R 1/04; B60R 2300/404; B60R 2001/1253; B60R 2370/777; B60R 2300/8066; B60R 2001/1215; B60K 35/00

USPC .......................................................... 359/604
See application file for complete search history.

(56) References Cited

U.S. PATENT DOCUMENTS

| 6,520,690 B2 * | 2/2003 | Chu ................. B60R 1/12 340/457 |
| 2007/0183068 A1* | 8/2007 | Kozlowski ............... B60R 1/04 359/877 |
| 2014/0347488 A1* | 11/2014 | Tazaki ..................... B60R 1/12 348/148 |

FOREIGN PATENT DOCUMENTS

| JP | H05338493 | 12/1993 |
| JP | 2013244753 | 12/2013 |
| JP | 2014015198 | 1/2014 |
| JP | 2016155545 | 9/2016 |
| JP | 2017030425 | 2/2017 |
| KR | 1020030007006 | 1/2003 |

* cited by examiner

*Primary Examiner* — Jade R Chwasz
*Assistant Examiner* — Rahman Abdur
(74) *Attorney, Agent, or Firm* — Fish & Richardson P.C.

(57) ABSTRACT

A rear-view mirror for a vehicle includes a body part, a mirror part, a display part, and an input member configured to control at least one of the body part or the display part, the input member configured to be selectively arranged in first, second, and third states. Based on the input member being in the first state, the body part is configured to be placed in a first position, and the display part is configured to turn on, based on the input member being in the second state, the body part is configured to be placed in a second position, and the display part is configured to turn on, and based on the input member being in the third state, the body part is configured to be placed in the second position, and the display part is configured to turn off.

19 Claims, 13 Drawing Sheets

(a)

(b)

(a)

(b)

(a)

(b)

(a)

(b)

(a)

(b)

(c)

(a)

(b)

(a)

(b)

(a)

(b)

REAR-VIEW MIRROR FOR VEHICLE

CROSS-REFERENCE TO RELATED APPLICATION

This application claims the priority benefit of Korean Patent Application No. 10-2017-0057449, filed on May 8, 2017, in the Korean Intellectual Property Office, the disclosure of which is incorporated herein by reference.

FIELD

The present disclosure relates to a rear-view mirror for vehicle, and more particularly to a rear-view mirror for a vehicle, which is able to operate in a mirror mode and a display mode.

BACKGROUND

A rear-view mirror can be disposed inside of a vehicle and a driver is able to see rearward through the rear-view mirror.

Through a mirror attached to the rear-view mirror, the driver is able to see the rear of the vehicle over a rear windshield of the vehicle.

However, a rear-view mirror acting as a simple mirror may not be used when the rear windshield of the vehicle is covered, and only a limited range of areas can be seen through the mirror.

In some examples, a rear-view mirror capable of displaying an image captured by a backup camera has been developed.

The rear-view mirror capable of displaying an image captured by the backup camera may allow a user to see a wider range of areas than the rear-view mirror acting as a simple mirror. In addition, the rear-view mirror capable of displaying an image captured by the backup camera can be used even when the rear windshield is covered.

However, if an error occurs in in the backup camera or a lens thereof, the rear-view mirror capable of displaying an image captured by the backup camera may not operate properly.

Recently, there is ongoing efforts to develop a rear-view mirror which is capable of selectively acting as a mirror or a display for outputting an image captured by the backup camera.

In addition, if such a rear-view mirror is used, different optimal angles may be required to use the rear-view mirror as a simple mirror and as a display. In some cases, it may be necessary to adjust the rear-view mirror at a different angle in each situation.

In addition, there are attempts to develop a rear-view mirror in which angle adjustment and mirror-image transition can be controlled individually.

SUMMARY

One object of the present disclosure may be to provide a rear-view mirror for vehicle, which selectively operates in a mirror mode and a display mode.

Another object of the present disclosure may be to provide a rear-view mirror for vehicle, which is tilted at a different angle in each of a mirror mode and a display mode.

Another object of the present disclosure may be to provide a rear-view mirror for vehicle, which is capable of controlling angle adjustment and transition between a mirror and an image individually.

Objects of the present disclosure should not be limited to the aforementioned objects and other unmentioned objects will be clearly understood by those skilled in the art from the following description.

According to one aspect of the subject matter described in this application, a rear-view mirror for a vehicle includes a body part, a mirror part coupled to the body part, a display part coupled to the body part, and an input member configured to control at least one of the body part or the display part, the input member configured to be selectively arranged in first, second, and third states. Based on the input member being in the first state, the body part is configured to be placed in a first position, and the display part is configured to turn on. Based on the input member being in the second state, the body part is configured to be placed in a second position, and the display part is configured to turn on. Based on the input member being in the third state, the body part is configured to be placed in the second position, and the display part is configured to turn off.

Implementations according to this aspect may include one or more of the following features. For example, the mirror part may be configured to, based on a transition of the body part from the first position to the second position, orient a forward direction of the mirror part to a direction that is inclined downward by an angle with respect to a horizontal line passing the body part. The input member may include a lever that is rotatably coupled to the body part. In the first state of the input member, the lever may be tilted by a first angle with respect to a vertical line. In the second state of the input member, the lever may be tilted by a second angle with respect to the vertical line. In the third state of the input member, the lever may be tilted by a third angle with respect to the vertical line.

In some implementations, the lever may be configured to rotate relative to the body part in a first rotation range and in a second rotation range, the first rotation range corresponds to a range in which the lever rotates to transition from the first state to the second state or to transition from the second state to the first state, and the second rotation range corresponds to a range in which the lever rotates to transition from the second state to the third state or to transition from the third state to the second state.

In some implementations, the rear-view mirror may further include a connection member connected to the body part and to the lever, where the connection member is connected to the lever by a detent structure configured to restrict rotation of the lever relative to the body part. The connection member may include a first detent part, the lever may include a second detent part, where the first and second detent parts are configured to couple to each other to form the detent structure. The first detent part includes a first groove, a second groove, and a protrusion located between the first groove and the second groove. The second detent part may be configured to engage the first groove based on the lever being in the first state or in the second state, engage the second groove based on the lever being in the third state, and pass the protrusion of the first detent part based on rotation of the lever in the second rotation range.

In some implementations, the connection member may include a first stopper configured to limit rotation of the body part. The first stopper may be configured to contact an inner rear surface of the body part based on the lever being in the first state, and contact an inner front surface of the body part based on the lever being in the second state. The first stopper and the protrusion of the first detent part may define the first rotation range. The body part may include a lever support configured to support at least a portion of the lever, and the lever may include a second stopper configured to contact a lower portion of the lever support based on the lever being in the third state.

In some examples, the second stopper may be further configured to contact an upper portion of the lever support based on the lever being in the first state. The lever may be further configured to, based on a transition to the third state, automatically transition to a fourth state in which the lever is positioned within the first rotation range or the second rotation range. The display part may be further configured to switch an On-Off state of the display part based on a transition of the lever to the third state, and to maintain the On-Off state of the display part based on an automatic transition of the lever from the third state to the fourth state. In some examples, the display part may be further configured to turn on based on a transition of the lever from the fourth state to the first state.

In some implementations, the input member may include a lever rotatably coupled to the body part and at least one button. The first state of the input member may include a state in which the lever is tilted by a first angle with respect to a vertical line and in which the at least one button receives a first input. The second state of the input member may include a state in which the lever is tilted by a second angle with respect to the vertical line and in which the at least one button receives the first input. The third state of the input member may include a state in which the lever is tilted by the second angle with respect to the vertical line and in which the at least one button receives a second input. The display part may be further configured to turn on based on a reception of the first input to the at least one button, and to turn off based on a reception of the second input to the at least one button. The body part may be further configured to be placed in the first position based on the lever being tilted by the first angle with respect to the vertical line, and to be placed in the second position based on the lever being tilted by the second angle with respect to the vertical line.

In some examples, the at least one button may include a rear button provided at a rear surface of the lever and configured to receive the first input, and a front button provided at a front surface of the lever and configured to receive the second input. The input member may include first and second levers that are each rotatably coupled to the body part. The first state of the input member may include a state in which both of the first and second levers are tilted by a first angle with respect to a vertical line. The second state of the input member may include a state in which the first lever is tilted by a second angle with respect to the vertical line and in which the second lever is tilted by the first angle with respect to the vertical line. The third state of the input member may include a state in which both of the first and second levers are tilted by the second angle with respect to the vertical line. The display part may be further configured to turn on based on the second lever being tilted by the first angle with respect to the vertical line, and to turn off based on the second lever being tilted by the second angle with respect to the vertical line. The body part may be further configured to be placed in the first position based on the first lever being tilted by the first angle with respect to the vertical line, and to be placed in the second position based on the first lever being tilted by the second angle with respect to the vertical line.

In some examples, the second lever may be configured to, based on the input member being in the first state, rotate to a second lever position corresponding to the second angle by rotation of the first lever from a first lever position corresponding to the first angle to the second lever position corresponding the second angle. The first lever may include a lever protrusion that is configured to, based on the input member being in the first state, cause the second lever to rotate to the second lever position by rotation of the first lever from the first lever position to the second lever position.

In some examples, the rear-view mirror may further include a third lever member configured to selectably couple the first and second levers to each other, and the first and second levers are configured to, based on the third lever member coupling the first and second levers to each other, rotate together and be tilted by an angle with respect to the vertical line. The second lever may be allowed to rotate based on the first lever being tilted by the second angle with respect to the vertical line, and the second lever may be not allowed to rotate based on the first lever being tilted by the first angle with respect to the vertical line.

In some implementations, the mirror part may include a half mirror disposed in front of the display part and configured to reflect a portion of light and to transmit a portion of light.

The details of other implementations are included in the following description and the accompanying drawings.

The implementations of the present disclosure have one or more effects as follows.

First, a user may be able to selectively utilize a rear-view mirror as a mirror or as a display for outputting an image captured by the backup camera.

Second, it is possible to control the body of the rear-view mirror to be tilted at an optimal angle in each of the mirror mode and the display mode.

Third, it is possible to control adjustment of an angle of the rear-view mirror and transition between a mirror and an image individually and, if necessary, simultaneously, thereby improving user convenience.

Effects of the present disclosure should not be limited to the aforementioned effects and other unmentioned effects will be clearly understood by those skilled in the art from the claims.

BRIEF DESCRIPTION OF THE DRAWINGS

The implementations will be described in detail with reference to the following drawings.

DETAILED DESCRIPTION

Figure 1:
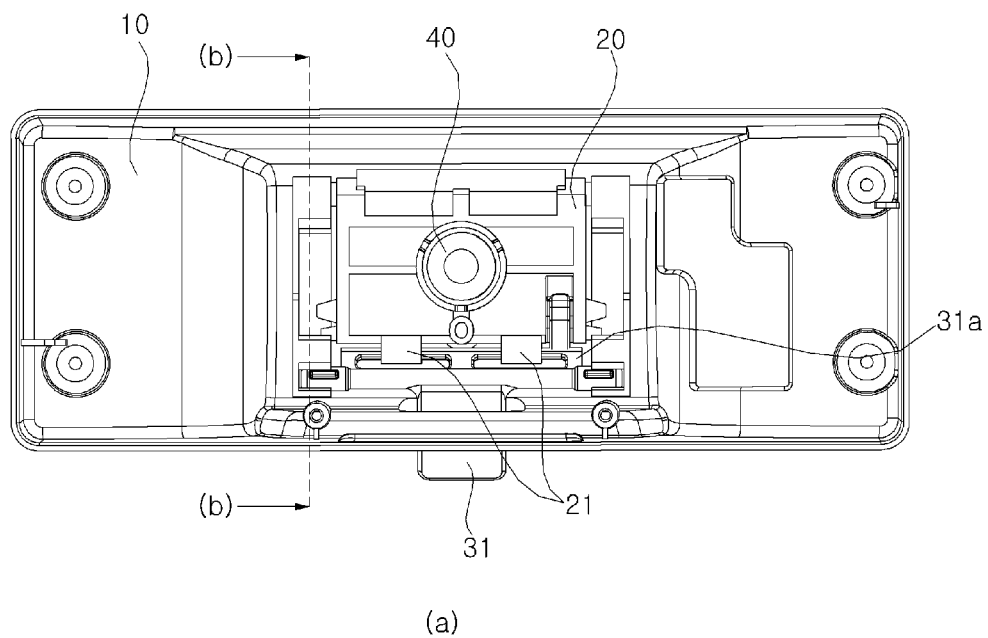
FIG. 1 is a diagram illustrating a configuration and a shape of an example rear-view mirror for a vehicle.
Figure 1:
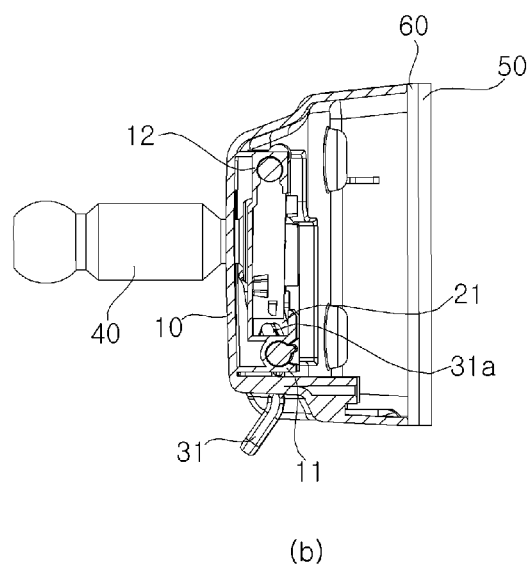

Description will now be given in detail according to exemplary implementations disclosed herein, with reference to the accompanying drawings.

An example rear-view mirror for a vehicle may include a mirror part 50, a display part 60, a body part 10 via which the mirror part 50 and the display part 60 are connected, an input member, and a fixing member 40.

The mirror part 50 may be a component that reflects light. For example, the mirror part 50 may be a mirror. The mirror part 50 may be a half mirror. The half mirror is a mirror having predetermined transmittance and reflectance. For example, each of the transmittance and reflectance of the half mirror may be 50%.

In some implementations, the mirror part 50 may be a half mirror, and the mirror part 50 may be disposed in front of the display part 60. In this case, when the display part 60 is in an On state, part of light from the display part 60 may pass through the mirror part 50. A user may see an image displayed on the display part 60 which is disposed on the rear surface of the mirror part 50. When the display part 60 is in an Off state, the user may see a reflected image on the mirror part 50. Accordingly, when the rear-view mirror is in a mirror mode, the display part 60 may enter the Off state, so that the user may see a mirror. When the rear-view mirror is in a display mode, the display part 60 may enter the On state, so that the user may see an image displayed on the display part 60.

In some implementations, the mirror part 50 may be a mirror, and the display part 60 may be a transparent display. The display part 60 may be disposed in front of the mirror part 50. Even in this case, if the display part 60 enters the Off state to become transparent, the mirror part 50 disposed behind the display part 60 may act as a mirror. If the display part 60 enters the On state to output a specific image, a user may see the specific image through the rear-view mirror.

The display part 60 may include at least one of a Liquid Crystal Display (LCD), a Thin Film Transistor-Liquid Crystal display (TFT LCD), Organic Light-Emitting Diode (OLED), a flexible display, a 3D display, and an e-ink display.

The display part 60 may form an interlayer structure with a touch-type input device or may be integrally disposed with the touch-type input device to implement a touch screen. In this case, even the mirror part 50 may form an interlayer structure with the touch-type input device.

The body part 10 may include a component that forms a part or the entire of the external appearance of the rear-view mirror. Various components of the rear-view mirror may be disposed inside of the body part 10. For example, the body part 10 may be a housing of the rear-view mirror.

The input member may include various devices capable of receiving a user's input. For example, the input member may include a rotatable lever 31, a mechanic button, a touch sensor, and a dial.

The input member may be disposed in one region of the rear-view mirror. In addition, the input member may be disposed in one region of a steering wheel, one region of an instrument panel, one region of a seat, one region of each pillar, one region of a door, one region of a center console, one region of a head lining, one region of a sun visor, one region of a windshield, or one region of a window.

The input member may include any kind device as long as the device is able to be manipulated by a user.

The fixing member 40 may include a device for fixing the rear-view mirror inside the vehicle.

Hereinafter, example implementations of the rear-view mirror will be described with reference to the accompanying drawings. The form of a rear-view mirror in the drawings is merely an implementation of the present disclosure, and the rear-view mirror may be implemented in any other form.

FIG. 1 is a diagram illustrating an example configuration and shape of an example rear-view mirror for a vehicle.

The drawing (a) in FIG. 1 is a diagram illustrating the front surface of example components of the rear-view mirror. In (a) of FIG. 1, a rear-view mirror is depicted without showing a mirror part 50 and a display part 60. The drawing (b) in FIG. 1, (b) is a side sectional view of example components of the rear-view mirror.

The rear-view mirror may include a body part 10, a connection member 20, an input member, and a fixing member 40.

The rear-view mirror may further include the connection member 20 which is connected to the body part 10 and the lever 31. The connection member 20 may be referred to as a retainer. The connection member 20 is connected to the fixing member 40.

The fixing member 40 may fix the rear-view mirror to the vehicle. The connection member 20 connected to the fixing member 40 may be rotated around the fixing member 40 by a specific degree.

The connection member 20 may be connected to the body part 10. The connection member 20 may be connected to a connection member support 12 disposed inside of the body part 10. The connection member 20 may be rotated around the connection member support 12 of the body part 10.

The input member may be the lever 31 which is able to be rotated with being connected to the body part 10. The lever 31 may be connected to a lever support 11 disposed inside of the body part 10. The lever 31 may be rotated around a shaft connected to the lever support 11 of the body part 10.

A portion of the lever 31 may be located inside of the body part 10, and the rest portion of the lever 31 may be located outside of the body part 10. In this case, one region of the lever 31 outside of the body part 10 is a handle 31c that is manipulated by a user. The user may push or pull the handle 31c to rotate the lever 31

The lever 31 is connected to the connection member 20. A structure of connection between the connection member 20 and the lever 31 is a detect structure. The detent structure is a structure in which a first detent part 21 and a second detent part 31a are combined with each other. The first detent part 21 and the second detent part 31a are combined with each other to form the detent structure.

The connection member 20 may include the first detent part 21. The first detent part 21 may be disposed in one region of the connection member 20. The first detent part 21 may be disposed in one region of the connection member 20, which is connected to the lever 31.

The lever 31 may include the second detent part 31a. The second detent part 31a may be disposed in one region of the lever 31. The second detent part 31a may be disposed in one region of the lever 31, which is connected to the connection member 20.

Figure 2:
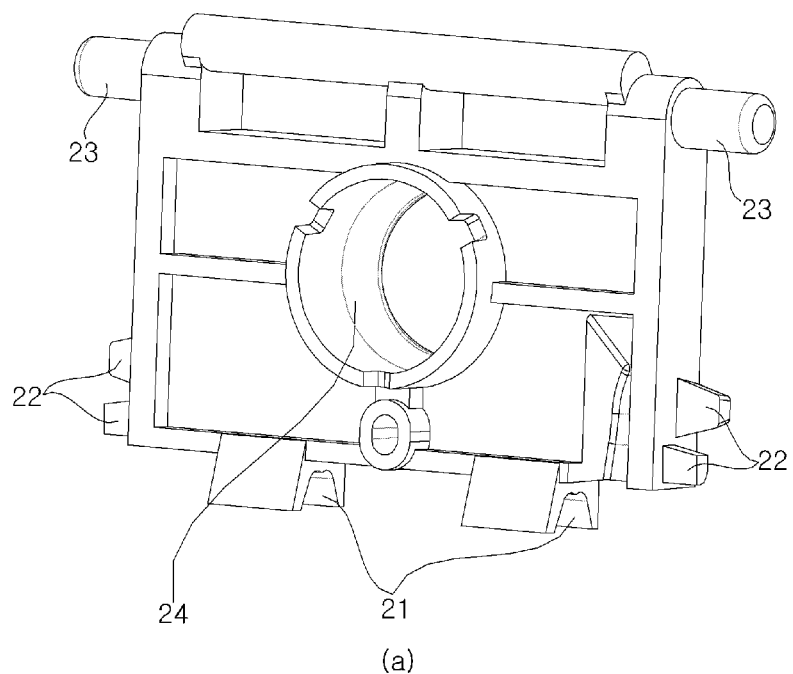
FIG. 2 is a diagram illustrating an example connection member.
Figure 2:
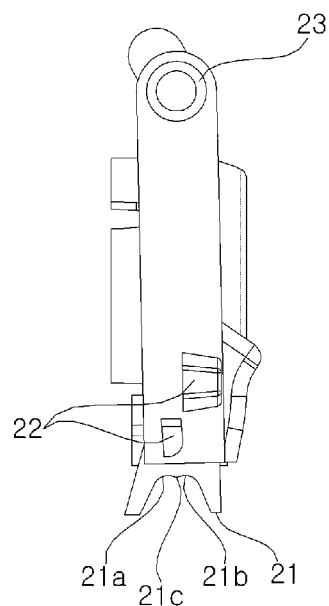

FIG. 2 is a diagram illustrating an example connection member.

The connection member 20 may include a first detent part 21, a first stopper 22, a first body coupling part 23, and a fixing member coupling part 24.

The first detent part 21 may be provided in one region of the connection member 20. The first detent part 21 may be a region of the connection member 20, which is connected to the lever 31. A location of the first detent part 21 may depend on which portion of the connection member 20 is connected to the lever 31. For example, in the case where the lever 31 is connected to a lower portion of the connection member 20, the first detent part 21 may be disposed in the lower portion of the connection member 20. On the contrary, in the case where the lever 31 is connected to an upper portion of the connection member 20, the first detent part 21 may be disposed in the upper portion of the connection member 20.

Referring to (b) of FIG. 2, the first detent part 21 may include a first groove 21a, a second groove 21b, and a protrusion 21c disposed between the first groove 21a and the second groove 21b.

Each of the first groove 21a and the second groove 21b may be in the shape of a groove disposed in the first detent part 21. Each of the first groove 21a and the second groove 21b may be a region which the second detent part 31a disposed in the lever 31 engages.

The protrusion 21c may be disposed between the first groove 21a and the second groove 21b. The protrusion 21c may be a region disposed between the first groove 21a and the second groove 21b as the first groove 21a and the second groove 21b are arranged side by side. The protrusion 21c may be a section which the lever 31 passes by when being rotated in a second rotation range.

The first stopper 22 may be provided in one region of the connection member 20. The first stopper 22 may come into contact with an inner rear surface or an inner front surface of the body part 10 so as to restrict the position of the body part 10 within a specific angle.

For example, the first stopper 22 may be disposed on both sides of the connection member 20. In another example, the first stopper 22 may be disposed on one side surface of the connection member 20. The first stopper 22 may be disposed at any location where the first stopper 22 is capable of restricting movement of the body part 10 and the lever 31. Except for the above, there is no particular limitation to a location of the first stopper 22.

The first body coupling part 23 may be a region of the connection member 20, which is connected to the body part 10. The first body coupling part 23 may be coupled to the connection member support 12 of the body part 10. The first body coupling part 23 may be rotated with being coupled to the connection member support 12. Accordingly, the connection member 20 may be rotated around the first body coupling part 23.

The fixing member coupling part 24 is a region to which the fixing member 40 is coupled. When the fixing member coupling part 24 is coupled to the fixing member 40, the connection member 20 may be rotated around the fixing member coupling part 24 by a specific degree.

Figure 3:
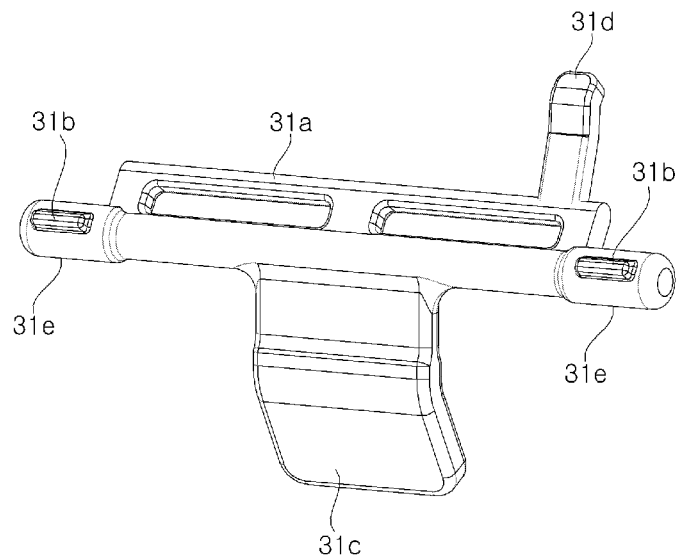
FIG. 3 is a diagram illustrating an example lever.
Figure 3:
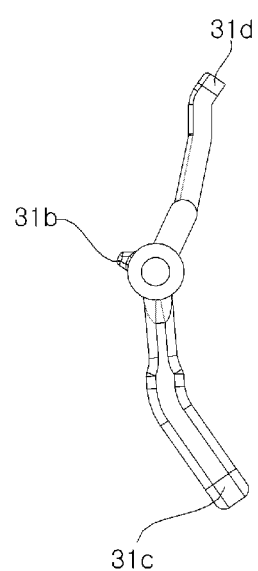

FIG. 3 is a diagram illustrating an example lever.

The lever 31 may include a second detent part 31a, a second stopper 31b, a handle 31c, a switch 31d, and a second body coupling part 31e.

The second detent part 31a may be provided in one region of the lever 31. The second detent part 31a is a region with which the first detent part 21 of the connection member 20 is combined. A location of the second detent part 31a may depend on which portion the lever 31 is connected to the connection member 20. For example, if an upper portion of the lever 31 is connected to a lower portion of the connection member 20, the second detent part 31a may be disposed in the upper portion of the lever 31. In another example, if a lower portion of the lever 31 is connected to an upper portion of the connection member 20, the second detent part 31a may be disposed in the lower portion of the lever 31.

When the lever 31 is in a first state or a second state, the second detent part 31a may engage the first groove 21a disposed in the first detent part 21. When the lever 31 is in a third state, the second detent part 31a may engage the second groove 21b disposed in the first detent part 21. If the lever 31 is rotated in a second rotation range, the second detent part 31a may pass by the protrusion 21c disposed in the first detent part 21. Since each of the connection member 20 and the lever 31 is rotatably fixed to a specific region of the body part 10, the second detent part 31a needs a specific force to pass by the protrusion 21c. Thus a user may feel a sense of manipulation when rotating the lever 31.

The second stopper 31b may be disposed in one region of the lever 31. In the example shown in the FIG. 3, the second stopper 31b is disposed in one region of a body coupling part, but there is no particular limitation to a location of the second stopper 31b.

Since the second stopper 31b is in contact with one region of the body part 10, the second stopper 31b may prevent the lever 31 from being rotated along a specific direction. For example, the second stopper 31b may come into contact with one region of the lever support 11 of the body part 10. When the second stopper 31b comes to contact with one region of the lever support 11, the lever 31 may be no longer rotated along the specific direction. For example, when the lever 31 is in a first state, the second stopper 31b may come into contact with an upper portion of the lever support 11 of the body part 10. In this case, the lever 31 is able to be rotated from the first state along one direction. For example, when the lever 31 is in the third state, the second stopper 31b may come into contact with a lower portion of the lever support 11 of the body part 10. In this case, the lever 31 is able to be rotated from the third state along one direction.

The handle 31c may be disposed in one region of the lever 31. The handle 31c may be a region which a user contacts when manipulating the lever 31. To this end, the handle 31c may be exposed outwardly from the body part 10. The handle 31c may be connected to a rotation shaft of the lever 31, so that a user is able to manipulate the handle 31c to rotate the lever 31.

The switch 31d may be disposed in one region of the lever 31. The switch 31d may be used to control operation of the display part 60. For example, upon transition of the lever 31 to the third state, the switch 31d may make the display part 60 enter the On state. For example, upon transition of the lever 31 to the first state or the second state, the switch 31d may make the display part 60 enter the Off state.

The second body coupling part 31e is a region of the lever 31, which is to be coupled to the body part 10. The second body coupling part 31e may be coupled to the lever support 11 of the body part 10. If the second body coupling part 31e is coupled to the lever support 11, the lever 31 may be able to be rotated. Accordingly, the lever 31 may be able to be rotated about a central axis of the second body coupling part 31e.

The rear-view mirror may be implemented such that the body part 10 is in a first position and the display part 60 is in the On state when the input member is in a first state. When the lever 31 is in the first state, the rear-view mirror may be in the display mode. When the rear-view mirror is in the display mode, the display part 60 may output an image captured by a backup camera of the vehicle. In this case, a driver is able to see the image through the rear-view mirror.

The rear-view mirror may be implemented such that the body part 10 is in a second position and the display part 60 is in the On state when the input member is in a second state. When the lever 31 is in the second state, the rear-view mirror may be in a tilting display mode.

The rear-view mirror may be implemented such that the body part is in the second position and the display part 60 is in the Off state when the input member is in a third state. When the lever 31 is in the first state, the rear-view mirror may be in a mirror mode.

When the body part 10 transitions from the first position to the second position, a forward direction of the mirror part 50 may be tilted downward at a specific angle. For example, when the mirror part 50 is a half mirror and the display part 60 is disposed on a rear surface of the mirror part 50, if the body part 10 is in the second position, the rear-view mirror may be in a mirror mode in which the rear-view mirror acts as a mirror. The forward direction of the mirror part 50 may be a direction in which a driver is able to see a rear image reflected and disposed on the mirror. Accordingly, the driver is able to see the rear of the vehicle through the mirror. Positions of the body part 10 will be described in detail with reference to FIG. 6.

Figure 4:
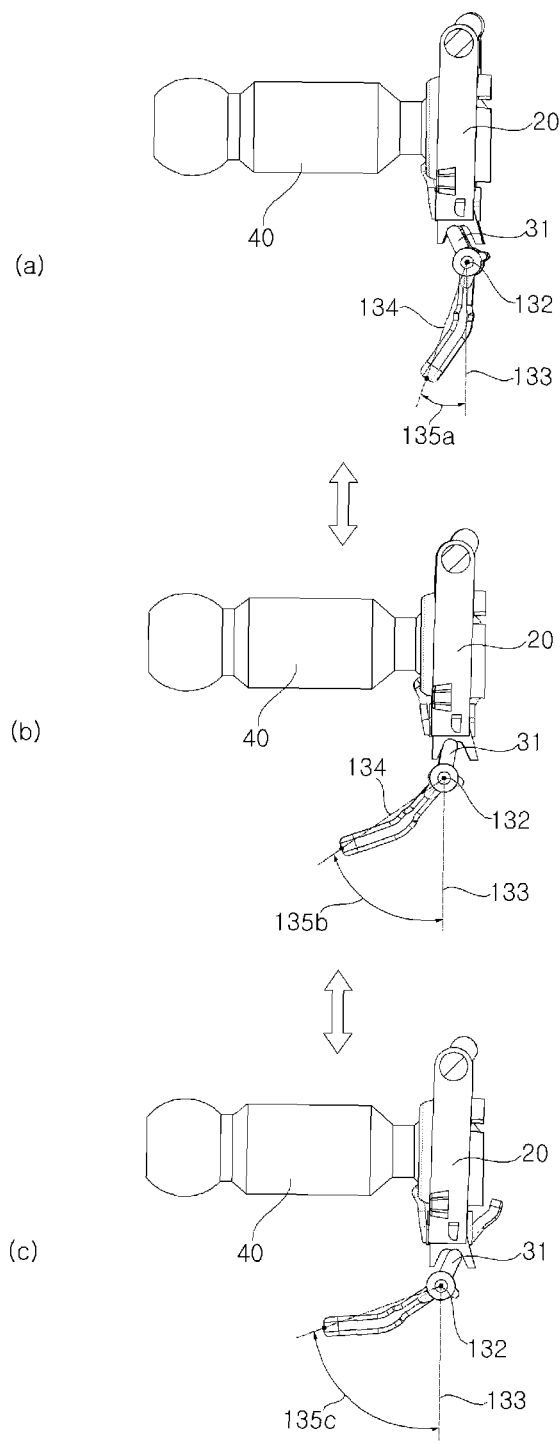
FIG. 4 is a diagram illustrating example states of an example lever as an example input member.
Figure 5:
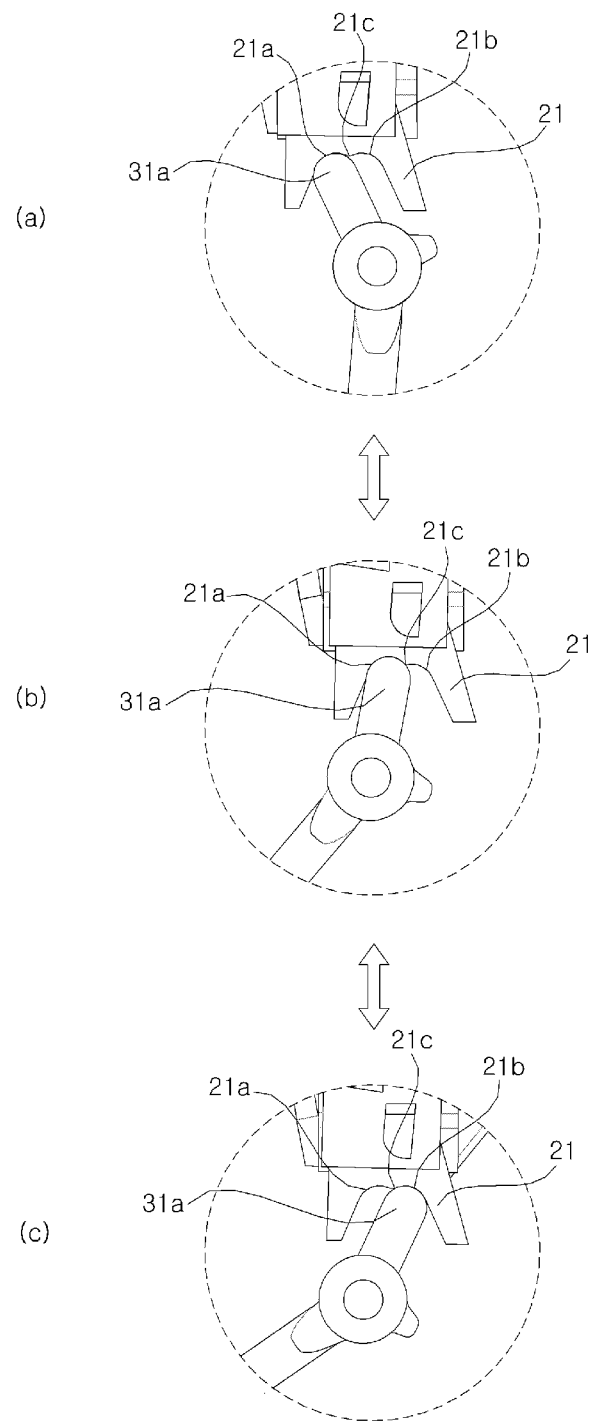
FIG. 5 is a diagram illustrating an example of a detent structure.

FIG. 4 is a diagram illustrating example states of an example lever as an input member. FIG. 5 is a diagram illustrating an example of a detent structure.

In examples where the input member is the lever 31, a first state may be a state in which the lever 31 is tilted at a first angle. A second state may be a state in which the lever 31 is tilted at a second angle. A third state may be a state in which the lever 31 is tilted at a third angle.

An angle at which the lever 31 is tilted may be an angle between a first line 133 passing the rotation shaft 132 of the lever 31 and a second line 134 passing the rotation shaft 132 of the lever 31 and the end portion of the handle 31c. For example, the first line 133 may be a vertical line that is vertical to a horizontal plane. The first, second, and third angles may be defined with respect to the vertical line.

When the lever 31 is in the first state, an angle between the first line 133 and the second line 134 may be the first angle 135a. When the lever 31 is in the first state, the second detent part 31a of the lever 31 may be disposed in the first groove 21a of the first detent part 21.

When the lever 31 is in the second state, an angle between the first line 133 and the second line 134 may be the second angle 135b. When the lever 31 is in the second state, the second detent part 31a of the lever 31 may be disposed in the first groove 21a of the first detent part 21.

When the lever 31 is in the third state, an angle between the first line 133 and the second line 134 may be the third angle 135c. When the lever 31 is in the third state, the second detent part 31a of the lever 31 may be disposed in the second groove 21b of the first detent part 21.

The lever 31 may be rotated in the first rotation range and the second rotation range.

The first rotation range is a range in which the lever 31 is rotated when transitioning from the first state to the second state or from the second state or to the first state.

The first rotation range may be disposed due to the first stopper 22 and the protrusion 21c.

The first stopper 22 is provided in the connection member 20. When the lever 31 is in the first state, the first stopper 22 may come into contact with the inner rear surface of the body part 10. When the lever 31 is in the second state, the first stopper 22 may come into contact with the inner front surface of the body part 10.

When the lever 31 transitions from the second state to the first state, the first stopper 22 may come into contact with the inner rear surface of the body part 10. In the case where the first stopper 22 is in contact with the inner rear surface of the body part 10, the lever 31 is not rotated any longer along a direction of rotation in which the lever 31 transitions from the second state to the first state.

When the lever 31 transitions from the first state to the second state, the first stopper 22 comes into contact with the inner front surface of the body part 10. In the case where the first stopper 22 is in contact with the inner front surface of the body part 10, the body part 10 is no longer able to be tilted further from the second position. Accordingly, although the lever 31 transitions to the third state, the body part 10 may remain in the second position.

When the lever 31 is in the second state, the second detent part 31a is located in the first groove 21a due to the protrusion 21c and prevented from automatically moving from the first groove 21a to the second groove 21b. That is, the protrusion 21c keeps the lever 31 remaining in the second state. If the protrusion 21c does not exist, the first groove 21a and the second groove 21b may be hardly distinguished, and thus, the second state and the third state of the lever 31 may be indistinguishable. Accordingly, the protrusion 21c may prevent the lever 31 from transitioning from the second state to the third state, thereby forming the first rotation range in which the lever 31 is rotated when transitioning from the first state to the second state.

The second rotation range is a range in which the lever 31 is rotated when transitioning from the second state to the third state or from the third state to the second state.

When the lever 31 transitions from the second state to the third state, the second stopper 31b comes into contact with a low portion of the body part 10. When the second stopper 31b is in contact with the low portion of the body part 10, the lever 31 is not rotated any longer along a direction of rotation in which the lever 31 transitions from the second state to the third state.

When the lever 31 transitions from the third state to the second state, the second detent part 31a engages the first groove 21a after moving from the second groove 21b and passing by the protrusion 21c. The second detent part 31a and the first groove 21a are shaped to engage each other. Thus, when the second detent part 31a engages the first groove 21a, the lever 31 may remain in the second state as long as an external force is not applied. Accordingly, a second rotation range may be disposed.

In the examples shown in the drawings, if a user pushes the lever 31 being in the first state, the lever 31 may transition from the first state to the second state. If the user pulls the lever 31 being in the second state, the lever 31 may transition from the second state to the first state. In this case, the lever 31 is rotated in the first rotation range. Although the lever 31 is rotated in the first rotation range, the location of the second detent part 31a may not move out of the first groove 21a.

In the examples shown in the drawings, if a user pushes the lever 31 being in the second state, the lever 31 may transition from the second state to the third state. If the user pulls the lever 31 being in the third state, the lever 31 may transition from the third state to the second state. In this case, the lever 31 may be rotated in the second rotation range. If the lever 31 is rotated in the second rotation range, the location of the second detent part 31a may be changed between the first groove 21a and the second groove 21b.

When the lever 31 is in the first state or the second state, the second detent part 31a may engage the first groove 21a.

When the lever 31 is in the third state, the second detent part 31a may engage the second groove 21b.

When the lever is rotated in the first rotation range, the second detent part 31a may be located in the first groove 21a. When the lever 31 is rotated in the second rotation range, the second detent part 31a may pass by the protrusion 21c. When the second detent part 31a passes by the protrusion 21c, pressure by the protrusion 21c may be transferred to the lever 31. As the pressure by the protrusion 21c is transferred to the lever 31, a user may feel a sense of manipulation when transitioning the lever 31 from the second state to the third state or from the third state to the second state.

Figure 6:
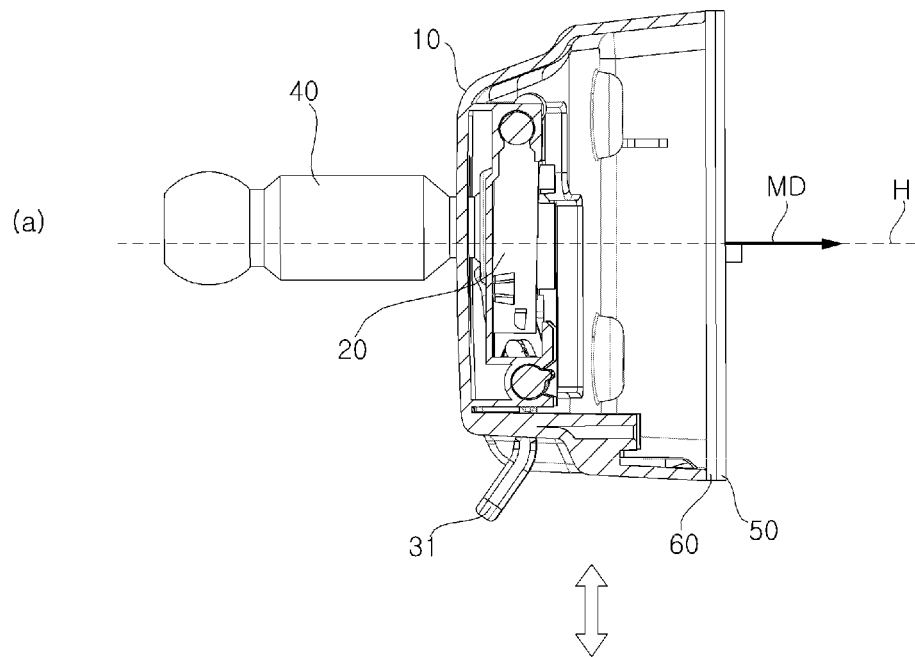
FIG. 6 is a diagram illustrating example positions of an example body part.
Figure 6:
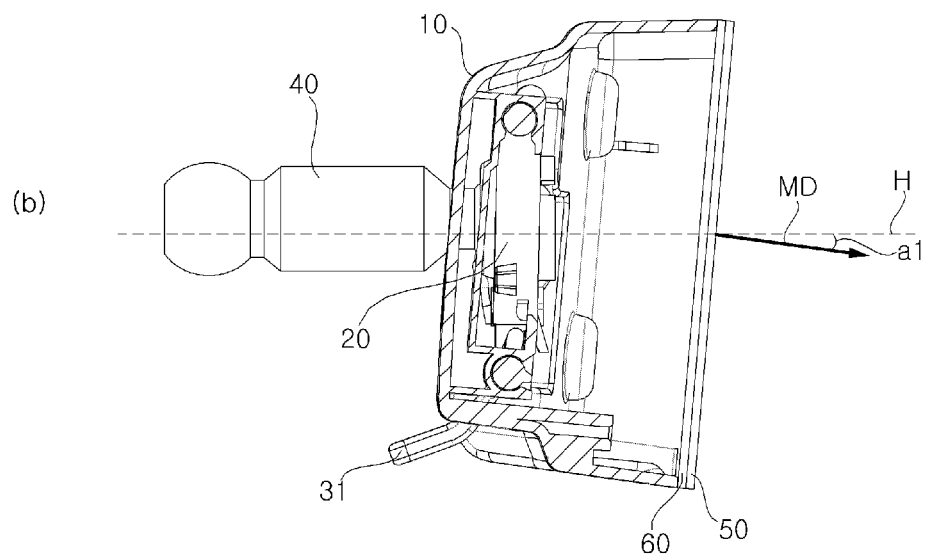
Figure 7:
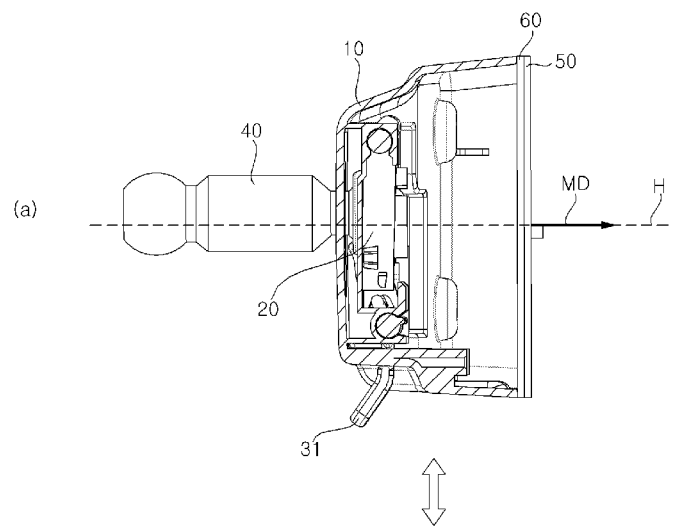
FIG. 7 is a diagram illustrating an example position of an example body part corresponding to each state of an example lever.
Figure 7:
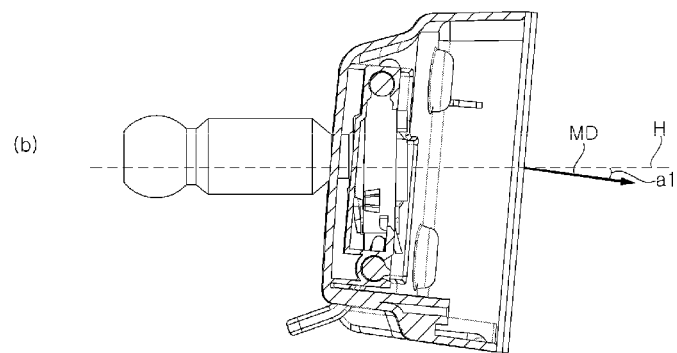
Figure 7:
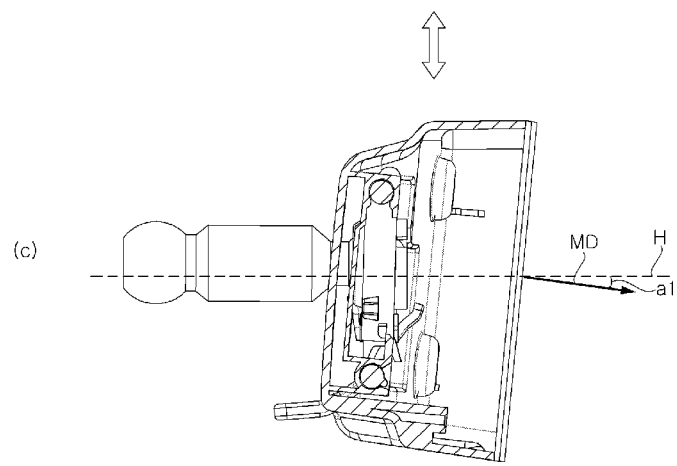

FIG. 6 is a diagram illustrating example positions of an example body part. FIG. 7 is a diagram illustrating an example position of an example body part corresponding to each state of an example lever.

When the input member is in the first state, the body part 10 is in the first position. When the input member is in the second state, the body part 10 is in the second position.

In the case where the input member is the lever 31, if an angle of the lever 31 is the first angle, the body part 10 may be in the first position. If an angle of the lever 31 is the second angle, the body part 10 may be in the second position.

When the body part 10 is in the first position, an angle between a forward direction MD of the mirror part 50 and the horizon H may be a fourth angle. When the body part 10 is in the second position, an angle between the forward direction MD of the mirror part 50 and the horizon H may be a fifth angle a1.

When the rear-view mirror is in the display mode, the body part 10 is in the first position. When the lever 31 is in the first state, the rear-view mirror may be in the display mode.

When the body part 10 is in the first position, the forward direction MD of the mirror part 50 may be tilted upward at a specific angle than when the body part 10 is in the second position. For example, when the body part 10 is in the first position, the forward direction MD of the mirror part 50 may be parallel to the horizon H. When the body part 10 is in the first position, an angle between the forward direction of the mirror part 50 and the horizon H may increase to the fifth angle a1.

When the rear-view mirror is in the tilting display mode or in the mirror mode, the body part 10 may be in the second position. When the lever 31 is in the second state, the rear-view mirror may be in the tilting display mode. When the lever 31 is in the third state, the rear-view mirror may be in the mirror mode.

Accordingly, when the lever 31 is rotated in the first rotation range, the position of the body part 10 may be changed between the first position and the second position.

Accordingly, although the lever 31 is rotated in the second rotation range, the body part 10 may remain in the second position.

When the body part 10 is in the second position, the forward direction MD of the mirror part 50 may be tilted downward at a specific angle than when the body part 10 is in the first position. For example, when the body part 10 is in the second position, an angle between the forward direction MD of the mirror part 50 and the horizon H may be greater than an angle between the forward direction MD of the mirror part 50 and the horizon H when the body part 10 is in the first position.

When the mirror part 50 is a half mirror, the mirror part 50 has a specific reflectance. Thus, even when a specific image is displayed on the display part 60, the image displayed on the display part 60 and an image reflected by the mirror part 50 may be all seen by a user's eyes.

In some examples, the mirror part 50 may show the ceiling of the vehicle in the display mode, so that an image reflected by the mirror part 50 cannot affect an image displayed on the display part 60. When the body part 10 is in the first position, a driver is able to see the ceiling of the vehicle through the mirror part 50. Because any other device or shape is provided on the ceiling, except for an illumination, it is possible to reduce the influence of an image reflected by the mirror part 50 on an image displayed on the display part 60. When the body part 10 is in the first position, the fourth angle between the forward direction MD of the mirror part 50 and the horizon H may be an angle at which the driver sees the ceiling of the vehicle through the mirror part 50. The fourth angle may be determined through experiments.

When the rear-view mirror is in the mirror mode, a user is allowed to see the rear of the vehicle through the mirror part 50. When the body part 10 is in the second position, the driver is able to see a rear windshield of the vehicle via the mirror part 50. When the body part 10 is in the second position, the fifth angle a1 between the forward direction MD of the mirror part 50 and the horizon H may be an angle by which the driver is able to see the rear windshield of the vehicle via the mirror part 50. The fifth angle a1 may be determined through experiments.

The rotation shaft of the connection member 20 exists in the connection member support 12 of the body part 10, the rotation shaft of the lever 31 exists in the lever support 11, and the second detent part 31a of the lever 31 is connected to the first detent part 21 of the connection member 20. Thus, if the lever 31 transitions from the first state to the second state while the connection member 20 connected to the fixing member 40 remains still, the rotation shaft of the input member and the second detent part 31a do not move and only the rotation shaft of the lever 31 moves backwards. Accordingly, when the lever 31 transitions from the first state to the second state, the body part 10 transitions from the first position to the second position and the forward direction MD of the mirror part 50 may be tilted downward at a specific degree.

In addition, when the lever 31 transitions from the second state to the third state, the first stopper 22 of the connection member 20 comes into contact with the inner front surface of the body part 10. Therefore, the body part 10 is no longer tilted, the location of the rotation shaft of the lever 31 is not changed, and the second detent part 31a moves from the first groove 21a to the second groove 21b. At this point, the second detent part 31a passes by the protrusion 21c of the first detent part 21, and pressure by the protrusion 21c is transferred to a user who manipulates the lever 31. As a result, the user may feel a sense of manipulation.

Figure 8:
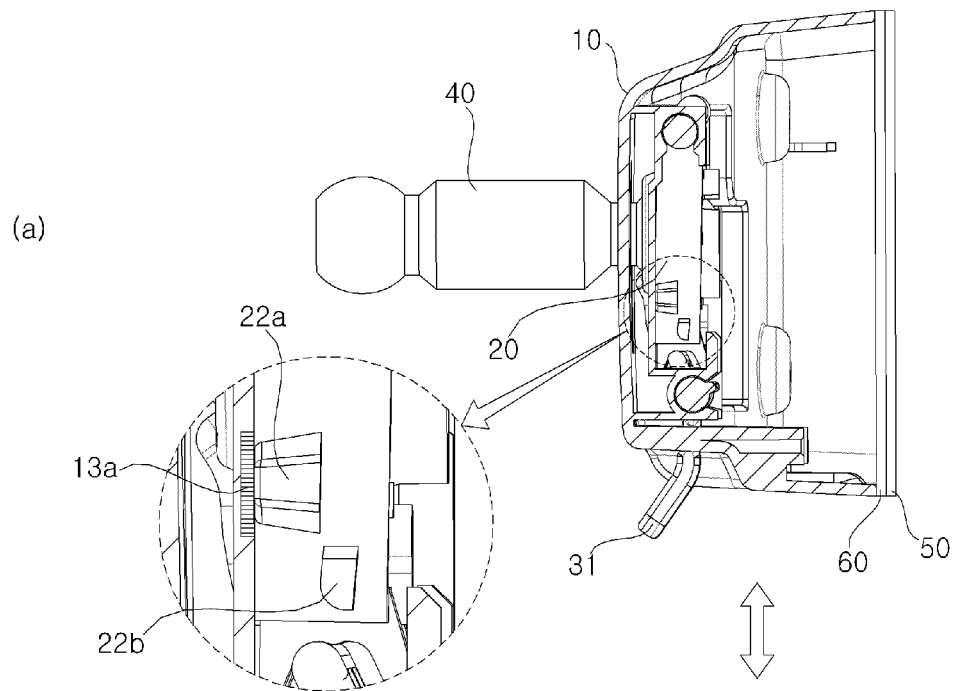
FIG. 8 is a diagram illustrating an example first stopper.
Figure 8:
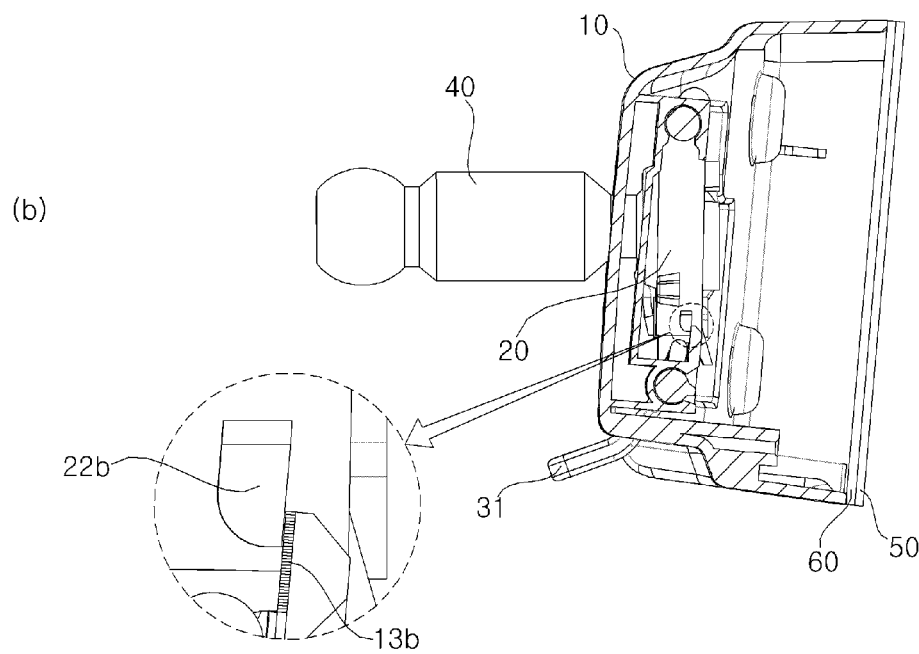

FIG. 8 is a diagram illustrating an example first stopper for explanation of the first stopper.

The first stopper 22 disposed in the connection member 20 may come into contact with an inner rear surface 13a of the body part 10 when the lever 31 is in the first state.

In some implementations, there may be one or two first stoppers 22. FIG. 8 shows an example in which there are two first stoppers 22. In this example, the first stoppers 22 may be divided into a third stopper 22a and a fourth stopper 22b.

Referring to a detail drawing (a) in FIG. 8, the third stopper 22a may come into contact with the inner rear surface 13a of the body part 10 when the lever 31 is in the first state. Accordingly, the position of the body part 10 is no longer able to be changed along a counter clockwise direction in the detail drawing. In this case, the forward direction of the mirror part 50 is no longer able to be tilted upward from the perspective of the front of the rear-view mirror.

Referring to a detail drawing (b) in FIG. 8, when the lever 31 transitions from the first state to the second state, the third stopper 22*a* may be spaced apart from the inner rear surface 13*a* of the body part 10 and the fourth stopper 22*b* may come into contact with the inner front surface 13*b* of the body part 10. Accordingly, the position of the body part 10 is no longer able to be changed along a clockwise direction in the drawing. In this case, the forward direction of the mirror part 50 is no longer able to be tilted downward from the perspective of the front of the rear-view mirror.

When the lever 31 is in the second state or the third state, the fourth stopper 22*b* may come into the inner front surface 13*b* of the body part 10. Accordingly, although a user manipulates the lever 31 to transition from the second state to the third state, the body part 10 may remain in the same position.

Figure 9:
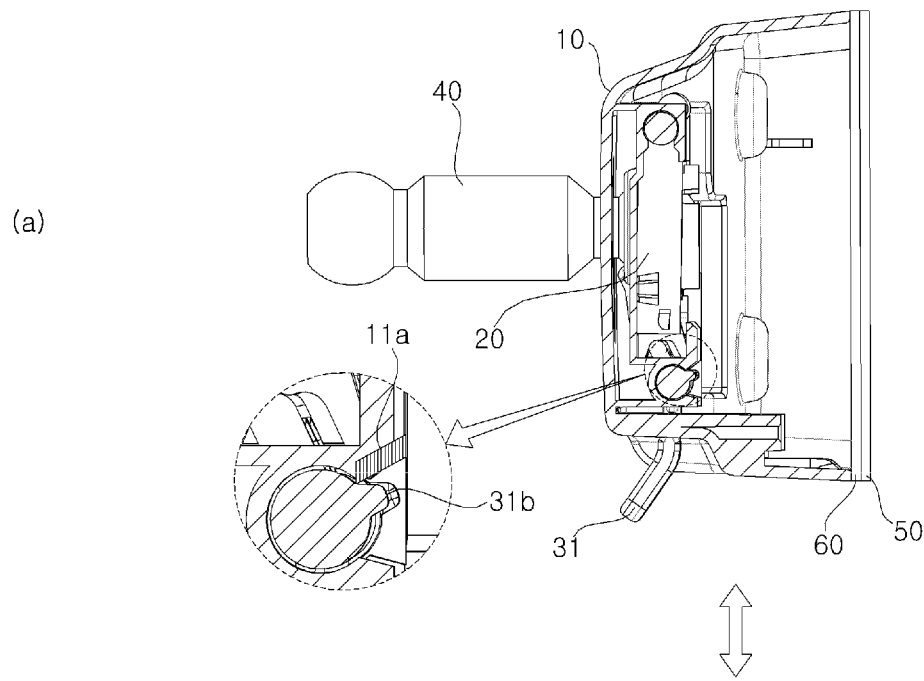
FIG. 9 is a diagram illustrating an example second stopper.
Figure 9:
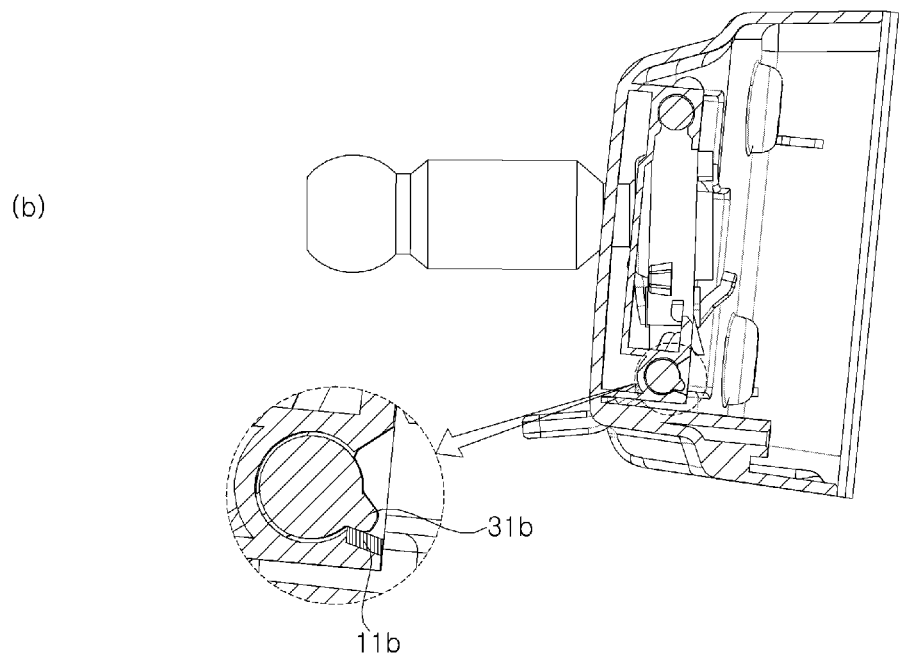

FIG. 9 is a diagram illustrating an example second stopper for explanation of the second stopper.

When the lever 31 is in the first state, the second stopper 31*b* disposed in the lever 31 may come into contact with an upper portion 11*a* of the lever support 11 in the body part 10.

Referring to a detailed drawing (a) in FIG. 9, when the lever 31 is in the first state, the second stopper 31*b* may come into contact with the upper portion 11*a* of the lever support 11 of the body part 10. Accordingly, the lever 31 is no longer able to be rotated along a clockwise direction in the drawing. In this case, the lever 31 may not be pulled further from the perspective of the front of the rear-view mirror.

When the second stopper 31*b* is in contact with the upper portion 11*a* of the lever support 11 of the body part 10, the first stopper 22 comes into contact with an inner rear surface of the body part 10. When the lever 31 is in the first state, the second stopper 31*b* comes into contact with the upper portion 11*a* of the lever support 11 of the body part 10, and the first stopper 22 comes into contact with an inner rear surface of the body part 10. Accordingly, it is possible to prevent the lever 31 and the body part 10 from being rotated further along one side direction.

Referring to a detailed drawing (b) in FIG. 9, when the lever 31 is in the third state, the second stopper 31*b* may come into contact with the lower portion 11*b* of the lever support 11 of the body part 10. Accordingly, the lever 31 may not be able to be rotated further along a clockwise direction in the drawing. In this case, the lever 31 may not be pushed further from the perspective of the front of the rear-view mirror.

Figure 10:
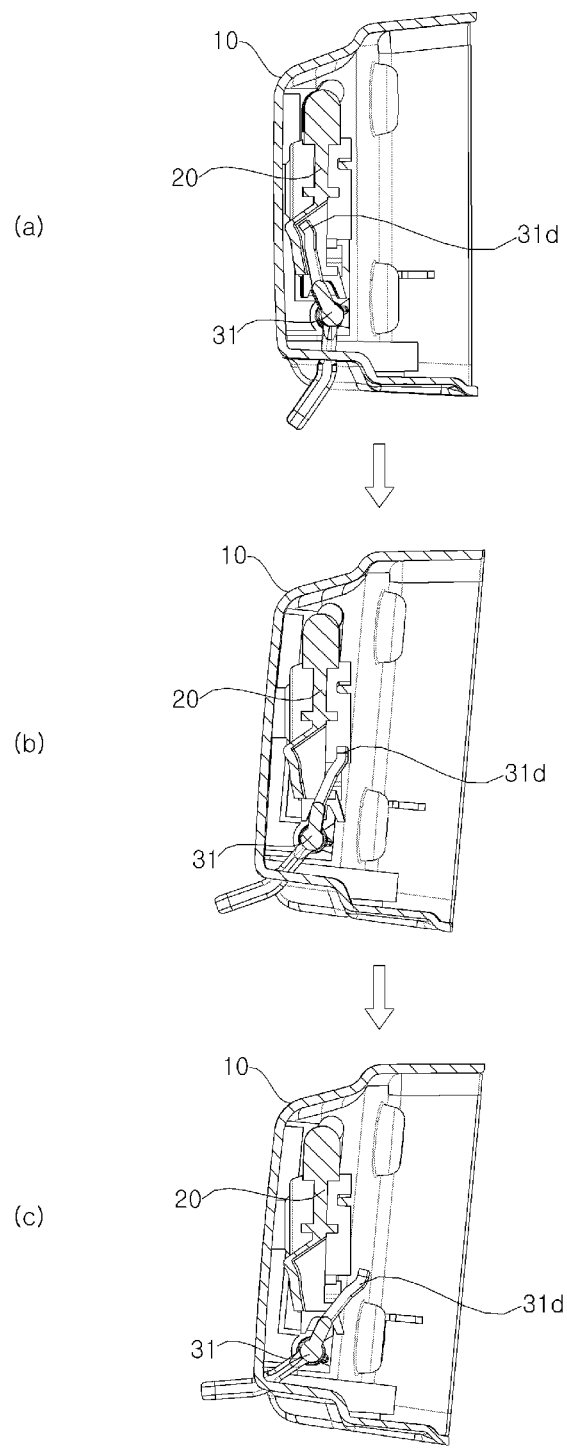
FIG. 10 is a diagram illustrating an example switch disposed in an example lever.

FIG. 10 is a diagram for explaining an example switch disposed in an example lever 31.

The switch 31*d* disposed in the lever 31 may be rotated upon rotation of the lever 31. The switch 31*d* may enable turning on or off the display part 60. The switch 31*d* may apply a power input to the display part 60.

In some implementations, the display part 60 may include a power receiver for receiving a power input.

For example, if a power input is received by the power receiver when the display part 60 is in an Off state, the display part 60 may transition to an On-state. If a power input is received by the power receiver when the display part 60 is in the On state, the display part 60 may transition to the Off state.

The power input unit may be a button for an electrical signal that corresponds to a power input which is applied when the button comes into contact with a specific object, receives pressure equal to or greater than a specific level, or is pressed to a specific depth or more.

When a power input is received, the power receiver may block an electrical signal from being transferred to the display part 60 or may transfer an electrical signal to the display part 60.

If a power input is received when the display part 60 is in an Off state, the power receiver may transfer, to the display part 60, an electrical signal corresponding to the power input. In this case, the display part 60 may transition to an On state.

If a power input is received when the display part 60 is the On state, the power receiver may block an electrical signal, which corresponds to the power input, from being transferred to the display part 60. In this case, the display part 60 may transition to the Off state.

The switch 31*d* may apply a power input to the power receiver of the display part 60. For example, when the lever 31 transitions from the first or second state to the third state, the switch 31*d* may be rotated along the same direction as a direction of rotation of the lever 31.

When the lever 31 transitions to the third state, the switch 31*d* may apply a power input to the power receiver of the display part 60.

For example, if the power receiver is a button which can be pressed to a specific depth, the switch 31*d* may press the power receiver while being rotated. When the lever 31 transitions to the third state, the switch 31*d* may press a button of the power receiver to the specific depth to thereby apply a power input. For example, in the case where the power receiver is a touch button that receives a power input in response to contact of the switch 31*d*, the switch 31*d* may come into contact with the touch button of the power receiver when the lever 31 transitions to the third state. Accordingly, the method by which the switch 31*d* applies a power input may vary depending on a type of the power receiver.

In some implementations, the lever 31 may automatically transition to the second state upon transition to the third state. In this case, the lever 31 may include a spring that enables the automatic transition of the lever 31 from the third state to the second state. Accordingly, although the lever 31 is rendered to the third state by an external force, the lever 31 may transition to the second state due to the spring.

In this case, the On-Off state of the display part 60 may be converted when the lever 31 transitions the third state. The On-Off state of the display part 60 is not converted when the lever 31 automatically transitions from the third state to the second state. The On-Off state of the display part 60 indicates the On state and the Off state of the display part 60.

For example, if the lever 31 transitions to the third state as being pushed by the user when the display part 60 is in the Off state, the display part 60 enters the On state. Then, if the user releases the lever 31, the lever 31 automatically transitions to the second state. In this case, the lever 31 is in the second state and the display part 60 remains in the On state.

For example, if the lever 31 transitions to the third state as being pushed by a user when the display part 60 is in the On state, the display part 60 enter the Off state. Then, if the user releases the lever 31, the lever 31 automatically transitions to the second state. In this case, the lever 31 is in the second state and the display part 60 remains in the Off state.

If the lever 31 transitions from the second state to the first state, the display part 60 may enter the On state. If the lever 31 transitions from the second state to the first state, the body part 10 transitions from the second position to the first position. When the body part 10 is in the first position, the rear-view mirror is in the display mode, and thus, the display part 60 needs to be in the On state.

For example, in the case where the lever 31 is in the second state and the display part 60 is in the Off state, if the lever 31 transitions to the first state the display part 60 transitions to the On state.

For example, in the case where the lever 31 is in the second state and the display part 60 is in the On state, if the lever 31 transitions to the first state, the display part 60 remains in the On state.

To this end, when the lever 31 transitions from the second state to the first state, the switch 31d may apply a power input to the display part 60. The power input applied by a switch when the lever 31 transitions to the first state is a power input for turning on the display part 60.

In some implementations, an input member may be a lever which is rotated with being connected to the body part 10, and a button disposed in the lever. The button may be disposed in one region of the handle 31c of the lever 31. For example, the button may be disposed on the front surface of the handle 31c. The button may be a touch-type button or a mechanic button.

In this case, the first state of the input member is a state in which the lever 31 is tilted at the first angle and a first input is received by the button. The second state of the input member may be a state in which the lever 31 is tilted at the second angle and a first input is received by the button. The third state of the input member is a state in which the lever 31 is tilted at the second angle and a second input is received by the button.

When the first input is applied to the button, the display part 60 enters the On state. When the second input is applied to the button, the display part 60 enters the Off state.

For example, the first input may be an input that is applied to the button when the display part 60 is in the Off state. Accordingly, if an input is applied to the button when the display part 60 is in the Off state, the display part 60 may transition to the On state.

For example, the second input may be an input that is applied to the button when the display part 60 is in the On state. Accordingly, if an input is applied to the button when the display part 60 is in the On state, the display part 60 may transition to the Off state.

The body part 10 is in the first position when the lever 31 is tilted at the first angle. The body part 10 is in the second position when the lever 31 is tilted at the second angle. In this case, there may be one rotation range of the lever 31. For example, if a user applies an input to the button by pushing the lever 31 tilted at the first angle, the body part 10 transitions from the first position to the second position and the On-Off state of the display part 60 is converted. The fact that the On-Off state of the display part 60 is converted means transition of the display part 60 from the On state to the Off state if the display was in the On state before the appliance of the input, or transition of the display part 60 from the Off state to the On state if the display was in the Off state before the appliance of the input.

In some implementations, the button disposed in the lever 31 may include a rear button disposed in the rear surface of the lever 31, and a front button disposed in the front surface of the lever 31.

In this case, a first input may be an input applied to the rear button, and a second input may be an input applied to the front button. Accordingly, when an input is applied to the rear button, the display part 60 may enter the On state. When an input is applied to the front button, the display part 60 may enter the Off state.

Figure 11:
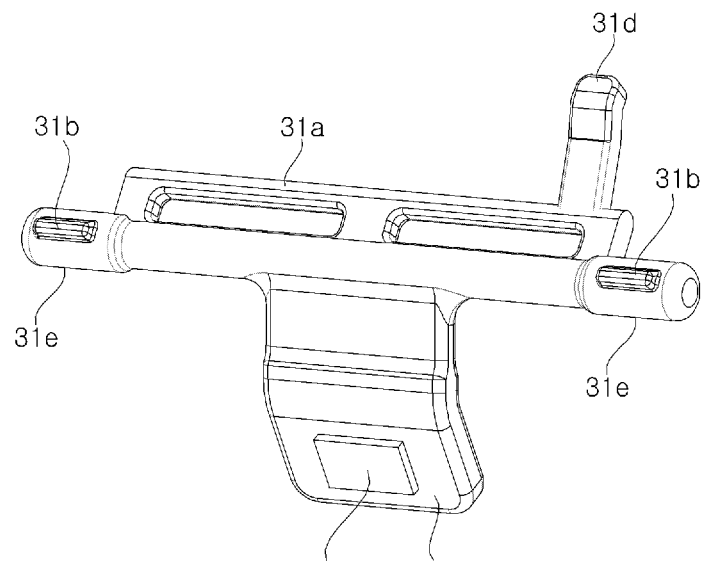
FIG. 11 is a diagram illustrating an example lever and an example button disposed on the example lever.
Figure 11:
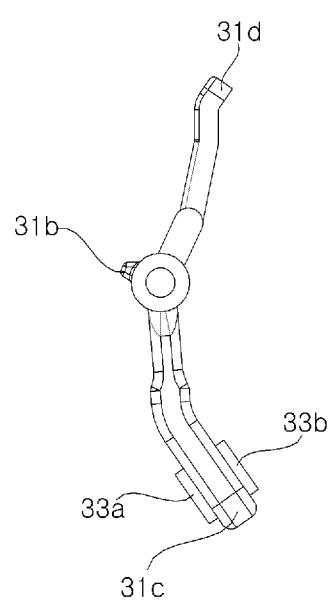

FIG. 11 is a diagram illustrating an example lever in which an example button is disposed.

In the example shown in the drawing, a button may be disposed in the handle 31c of the lever 31. A front button 33a may be disposed in the front surface of the handle 31c. A rear button 33b may be disposed in the rear surface of the handle 31c.

A pressure applied to the front button 33a may be a second input. The second input may be an input for turning off the display part 60. If a user pushes the lever 31, an input may be applied to the front button 33a disposed in the front surface of the handle 31c. If the lever 31 tilted at the first angle is pushed, the lever 31 may become tilted at the second angle and the body part 10 may transition to the second position. When the body part 10 is in the second position, the forward direction of the mirror part 50 is adjusted to be suitable for the mirror mode. Thus, it is desirable to turn off the display part 60. In the rear-view mirror, the front button 33a for turning off the display part 60 is disposed on the front surface of the handle 31c of the lever 31, so that an input is naturally applied to the front button 33a when a user pushes the lever 31 to transition the rear-view mirror to the mirror mode. Accordingly, it is possible to make a user's required manipulation simple.

An input applied to the rear button 33b is a first input. The first input is an input for turning on the display part 60. If a user pulls the lever 31, an input may be applied to the rear button 33b disposed in the rear surface of the handle 31c. If the lever 31 tilted at the second angle is pulled, the lever 31 becomes tilted at the first angle and the body part 10 transitions the first position. When the body part 10 is in the first position, the forward direction of the mirror part 50 is adjusted to be suitable for the display mode. Thus, it is desirable to turn on the display part 60. In the rear-view mirror, the rear button for turning on the display part 60 is disposed on the rear surface of the handle 31c of the lever 31, so that an input is naturally applied to the rear button 33b when a user pulls the lever 31 in order to transition the rear-view mirror to the display mode. Accordingly, it is possible to make the user's required manipulation simple.

Figure 12:
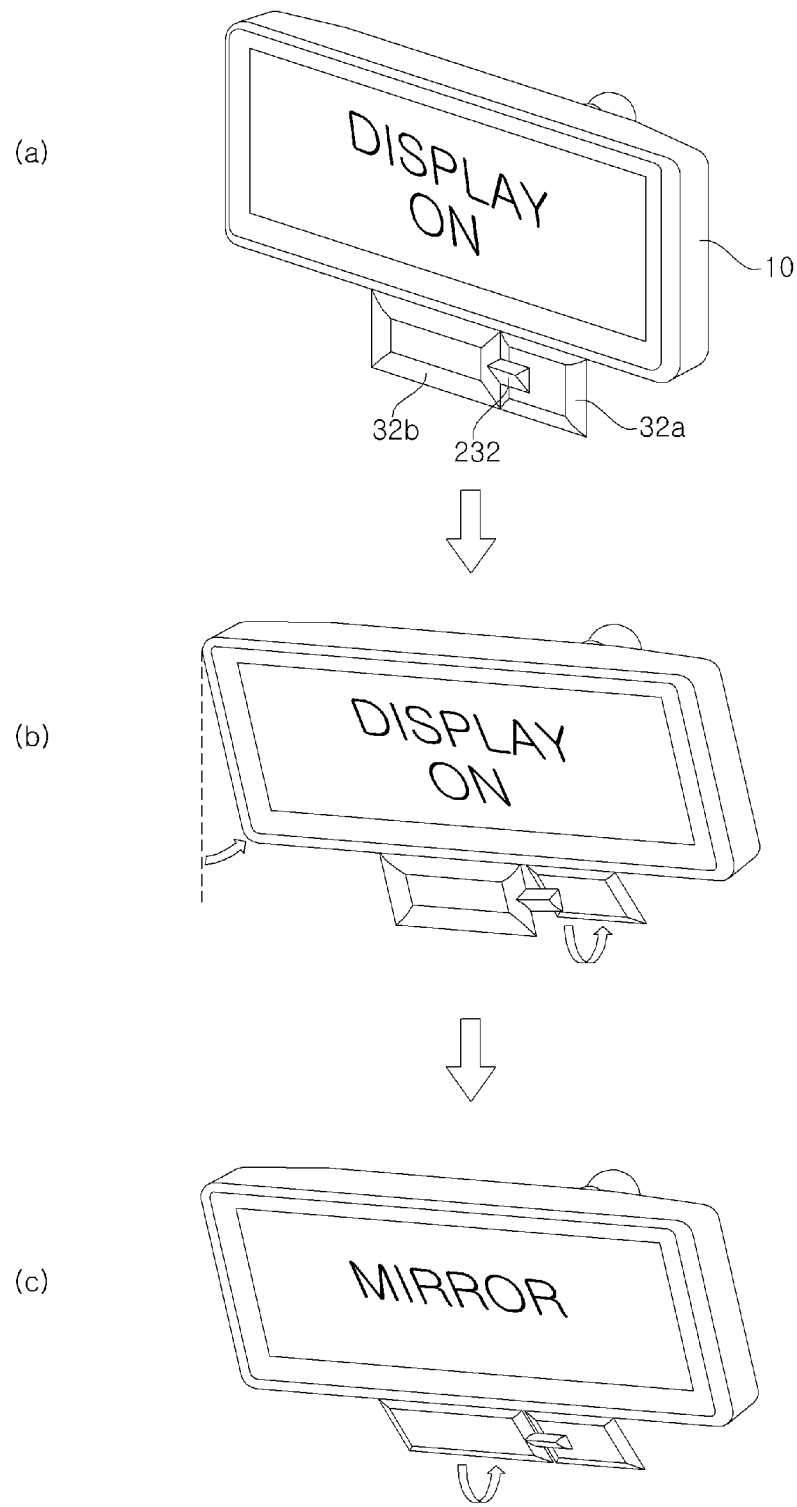
FIGS. 12 and 13 are diagrams illustrating an example rear-view mirror that includes two example levers.
Figure 13:
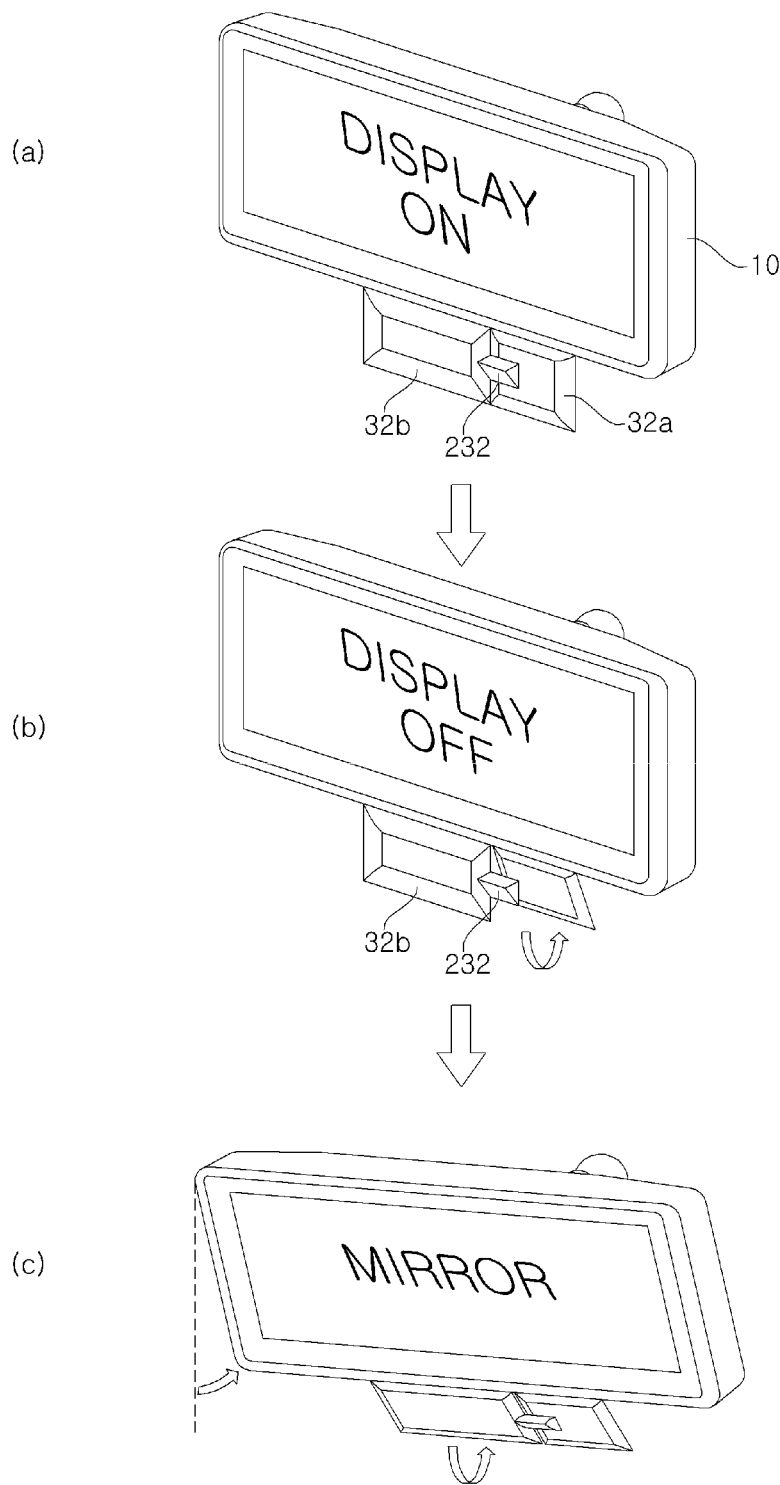

FIGS. 12 and 13 are diagrams illustrating an example in which a rear-view mirror includes two levers.

In some implementations, the input member may be a first lever 32a and a second lever 32b which are rotated with being connected to the body part 10.

A first state of the input member may be a state in which both of the first lever 32a and the second lever 32b are tilted at the first angle. A second state of the input member may be a state in which the first lever 32a is tilted at the second angle and the second lever 32b is tilted at the first angle. A third state of the input member may be a state in which both of the first lever 32a and the second lever 32b are tilted at the second angle. For example, an angle of the first lever 32a may be an angle between the front surface of the mirror part 50 and the front surface of the first lever 32a. An angle of the second lever 32b may be an angle between the front surface of the mirror part 50 and the front surface of the second lever 32b.

When the second lever 32b is tilted at the first angle, the display part 60 may enter the On state. When the second lever 32b is tilted at the second angle, the display part may enter the Off state.

When the first lever 32a is tilted at the first angle, the body part 10 may be in the first position. When the first lever 32a is tilted at the second angle, the body part 10 may be in the second position.

One of the first lever 32a and the second lever 32b may include a lever protrusion 232 that rotates the other lever.

Referring to FIG. 12, the second lever 32b may include a lever protrusion 232.

The drawing (a) in FIG. 12 indicates a state in which the first lever 32a and the second lever 32b are tilted at the first angle. The state in which the first lever 32a and the second lever 32b are tilted at the first angle is the same as the first state of the input member. In the case where the second lever 32b includes the lever protrusion 232, if the first lever 32a and the second lever 32b are tilted at the first angle and the second lever 32b is rotated to be tilted at the second angle, the first lever 32a is tilted as well by the lever protrusion 232. Accordingly, both of the first lever 32a and the second lever 32b become tilted at the second angle (which is the state shown in (c) of FIG. 12.)

Referring to (b) in FIG. 12, when the first lever 32a is rotated from the first angle to the second angle, the body part 10 may transition from the first position to the second position.

Then, when the second lever 32b is rotated from the first angle to the second angle, the display part 60 may transition from the On state to the Off state. In this case, the rear-view mirror may enter the mirror mode.

Referring to (c) in FIG. 12, the first lever 32a and the second lever 32b are tilted at the second angle.

In the case where the first lever 32a and the second lever 32b are tilted at the second angle, if only the first lever 32a is rotated to the first angle, the second lever 32b is rotated to the first angle as well by the lever protrusion 232.

Referring to FIG. 13, the first lever 32a may include a lever protrusion 232.

The drawing (a) of FIG. 13 shows a state in which the first lever 32a and the second lever 32b are tilted at the first angle. The state in which the first lever 32a and the second lever 32b are tilted at the first angle is the same as the first state of the input member. In the case where the input member is in the first state, if the first lever 32a is rotated from the first angle to the second angle, the second lever 32b may be rotated to the second angle. That is, in the case where the first lever 32a include the lever protrusion 232 and the first lever 32a and the second levers 32b are tilted at the first angle, if only the first lever 32 is rotated to the second angle, the second lever 32b is rotated as well by the lever protrusion 232. Accordingly, the first lever 32a and the second lever 32b may be tilted at the second angle (which is the state shown in (c) of FIG. 13).

Referring to (b) in FIG. 13, when the second lever 32b is rotated from the first angle to the second angle, the display part 60 may transition from the On state to the Off state.

Then, when the second lever 32b is rotated from the first angle to the second angle, the body part 10 may transition from the first position to the second position. In this case, the rear-view mirror enters the mirror mode.

The drawing (c) in FIG. 12 shows a state in which the first lever 32a and the second lever 32b are tilted at the second angle.

In the case where the first lever 32a and the second lever 32b are tilted at the second angle, if only the second lever 32b is rotated to the first angle, the first lever 32a is rotated to the first angle as well by the lever protrusion 232.

In some implementations, the rear-view mirror may further include a third lever member that combines the first lever 32a and the second lever 32b.

If the first lever 32a and the second lever 32b are combined by the third lever member, the first lever 32a and the second lever 32b are tilted at an identical angle. In addition, when the first lever 32a and the second lever 32b are combined, the first lever 32a and the second lever 32b may be rotated at the same time.

A user may combine the first lever 32a and the second lever 32b using the third lever member. In addition, the user may not combine the first lever 32a and the second lever 32b.

In some implementations, the second lever 32b may be rotated when the first lever 32a is tilted at the second angle, and may not be rotated when the first lever 32a is tilted at the first angle. That is, whether the second lever 32b is able to be rotated depends on the state of the first lever 32a.

When the first lever 32a is tilted at the second angle, the body part 10 is in the second position. In this case, the rear-view mirror may be in the mirror mode or the tilting display mode. If the body part 10 is in the second position, the first lever 32a is tilted at the second angle, and thus, the second lever 32b may be in a rotatable state. When the body part 10 is in the second position, a user may manipulate the second lever 32b to change the rear-view mirror to the mirror mode or the tilting display mode.

When the first lever 32a is tilted at the first angle, the body part 10 is in the first position. When the body part 10 is in the first position, the forward direction of the mirror is tilted upward and thus a driver is not able to see a rear windshield of the vehicle through the mirror part 50. In this case, the rear-view mirror cannot be used in the mirror mode and therefore it is desirable to operate the rear-view mirror in the display mode. In the case where the body part 10 is in the first position, if a user manipulates the second lever 32b to turn off the display part 60, the user is not able to check the rear of the vehicle via a rear-view mirror and it may cause a dangerous situation. Thus, the rear-view mirror does not allow the second lever 32b to be rotated when the body part 10 is in the first position, so that the display part 60 is prevented from being turned off.

Thus, the above implementations are to be considered in all respects as illustrative and not restrictive. The scope of the disclosure should be determined by reasonable interpretation of the appended claims, and all change which comes within the equivalent scope of the disclosure are included in the scope of the disclosure.

What is claimed is:

1. A rear-view mirror for a vehicle, comprising:
a body part;
a mirror part coupled to the body part;
a display part coupled to the body part;
an input member configured to control at least one of the body part or the display part, the input member configured to be selectively arranged in first, second, and third states, wherein the input member comprises a lever that is rotatably coupled to the body part; and
a connection member connected to the body part and the lever,
wherein:
based on the input member being in the first state, the body part is configured to be placed in a first position, and the display part is configured to turn on, based on the input member being in the second state, the body part is configured to be placed in a second position, and the display part is configured to turn on, and based on the input member being in the third state, the body part is configured to be placed in the second position, and the display part is configured to turn off, and wherein the connection member is connected to the lever by a detent structure configured to restrict rotation of the lever relative to the body part.

2. The rear-view mirror according to claim 1, wherein the mirror part is configured to, based on a transition of the body part from the first position to the second position, orient a forward direction of the mirror part to a direction that is inclined downward by an angle with respect to a horizontal line passing the body part.

3. The rear-view mirror according to claim 1, wherein:
in the first state of the input member, the lever is tilted by a first angle with respect to a vertical line,
in the second state of the input member, the lever is tilted by a second angle with respect to the vertical line, and
in the third state of the input member, the lever is tilted by a third angle with respect to the vertical line.

4. The rear-view mirror according to claim 3, wherein:
the lever is configured to rotate relative to the body part in a first rotation range and in a second rotation range,
the first rotation range corresponds to a range in which the lever rotates to transition from the first state to the second state or to transition from the second state to the first state, and
the second rotation range corresponds to a range in which the lever rotates to transition from the second state to the third state or to transition from the third state to the second state.

5. The rear-view mirror according to claim 4, wherein:
the connection member comprises a first detent part,
the lever comprises a second detent part,
the first and second detent parts are configured to couple to each other to form the detent structure,
the first detent part comprises a first groove, a second groove, and a protrusion located between the first groove and the second groove, and
the second detent part is configured to:
engage the first groove based on the lever being in the first state or in the second state,
engage the second groove based on the lever being in the third state, and
pass the protrusion of the first detent part based on rotation of the lever in the second rotation range.

6. The rear-view mirror according to claim 5,
wherein the connection member comprises a first stopper configured to limit rotation of the body part, and
wherein the first stopper is configured to:
contact an inner rear surface of the body part based on the lever being in the first state, and
contact an inner front surface of the body part based on the lever being in the second state.

7. The rear-view mirror according to claim 6, wherein the first stopper and the protrusion of the first detent part define the first rotation range.

8. The rear-view mirror according to claim 5,
wherein the body part comprises a lever support configured to support at least a portion of the lever, and
wherein the lever comprises a second stopper configured to contact a lower portion of the lever support based on the lever being in the third state.

9. The rear-view mirror according to claim 8, wherein the second stopper is further configured to contact an upper portion of the lever support based on the lever being in the first state.

10. The rear-view mirror according to claim 4,
wherein the lever is further configured to, based on a transition to the third state, automatically transition to a fourth state in which the lever is positioned within the first rotation range or the second rotation range, and
wherein the display part is further configured to:
switch an On-Off state of the display part based on a transition of the lever to the third state, and
maintain the On-Off state of the display part based on an automatic transition of the lever from the third state to the fourth state.

11. The rear-view mirror according to claim 10, wherein the display part is further configured to turn on based on a transition of the lever from the fourth state to the first state.

12. The rear-view mirror according to claim 1, wherein the mirror part comprises a half mirror disposed in front of the display part and configured to reflect a portion of light and to transmit a portion of light.

13. A rear-view mirror for a vehicle, comprising:
a body part;
a mirror part coupled to the body part;
a display part coupled to the body part; and
an input member configured to control at least one of the body part or the display part, the input member configured to be selectively arranged in first, second, and third states,
wherein:
based on the input member being in the first state, the body part is configured to be placed in a first position, and the display part is configured to turn on,
based on the input member being in the second state, the body part is configured to be placed in a second position, and the display part is configured to turn on, and
based on the input member being in the third state, the body part is configured to be placed in the second position, and the display part is configured to turn off,
wherein:
the input member comprises a lever rotatably coupled to the body part and at least one button,
the first state of the input member comprises a state in which the lever is tilted by a first angle with respect to a vertical line and in which the at least one button receives a first input,
the second state of the input member comprises a state in which the lever is tilted by a second angle with respect to the vertical line and in which the at least one button receives the first input,
the third state of the input member comprises a state in which the lever is tilted by the second angle with respect to the vertical line and in which the at least one button receives a second input,
the display part is further configured to:
turn on based on a reception of the first input to the at least one button, and
turn off based on a reception of the second input to the at least one button, and the body part is further configured to:
be placed in the first position based on the lever being tilted by the first angle with respect to the vertical line, and be placed in the second position based on the lever being tilted by the second angle with respect to the vertical line.

14. The rear-view mirror according to claim 13, wherein the at least one button comprises:
a rear button provided at a rear surface of the lever and configured to receive the first input; and
a front button provided at a front surface of the lever and configured to receive the second input.

15. A rear-view mirror for a vehicle, comprising:
a body part;
a mirror part coupled to the body part;
a display part coupled to the body part; and
an input member configured to control at least one of the body part or the display part, the input member configured to be selectively arranged in first, second, and third states,
wherein:
based on the input member being in the first state, the body part is configured to be placed in a first position, and the display part is configured to turn on,
based on the input member being in the second state, the body part is configured to be placed in a second position, and the display part is configured to turn on, and
based on the input member being in the third state, the body part is configured to be placed in the second position, and the display part is configured to turn off,
wherein:
the input member comprises first and second levers that are each rotatably coupled to the body part,
the first state of the input member comprises a state in which both of the first and second levers are tilted by a first angle with respect to a vertical line,
the second state of the input member comprises a state in which the first lever is tilted by a second angle with respect to the vertical line and in which the second lever is tilted by the first angle with respect to the vertical line,
the third state of the input member comprises a state in which both of the first and second levers are tilted by the second angle with respect to the vertical line,
the display part is further configured to:
turn on based on the second lever being tilted by the first angle with respect to the vertical line, and
turn off based on the second lever being tilted by the second angle with respect to the vertical line, and
the body part is further configured to:
be placed in the first position based on the first lever being tilted by the first angle with respect to the vertical line, and
be placed in the second position based on the first lever being tilted by the second angle with respect to the vertical line.

16. The rear-view mirror according to claim 15, wherein the second lever is configured to, based the input member being in the first state, rotate to a second lever position corresponding to the second angle by rotation of the first lever from a first lever position corresponding to the first angle to the second lever position corresponding the second angle.

17. The rear-view mirror according to claim 16, wherein the first lever comprises a lever protrusion that is configured to, based on the input member being in the first state, cause the second lever to rotate to the second lever position by rotation of the first lever from the first lever position to the second lever position.

18. The rear-view mirror according to claim 15, further comprising a third lever member configured to selectably couple the first and second levers to each other,
wherein the first and second levers are configured to, based on the third lever member coupling the first and second levers to each other, rotate together and be tilted by an angle with respect to the vertical line.

19. The rear-view mirror according to claim 15, wherein the second lever is allowed to rotate based on the first lever being tilted by the second angle with respect to the vertical line, and
wherein the second lever is not allowed to rotate based on the first lever being tilted by the first angle with respect to the vertical line.

* * * * *